United States Patent
Basin

(10) Patent No.: US 12,554,993 B2
(45) Date of Patent: Feb. 17, 2026

(54) SYSTEMS AND METHODS FOR AUTOMATICALLY GENERATING COMPUTER PROGRAMS BY MUTATING CODE WHILE ENSURING CODE VIABILITY

(71) Applicant: NOBLIS, INC., Reston, VA (US)

(72) Inventor: Ilya Basin, Vienna, VA (US)

(73) Assignee: NOBLIS, INC., Reston, VA (US)

( * ) Notice: Subject to any disclaimer, the term of this patent is extended or adjusted under 35 U.S.C. 154(b) by 1039 days.

(21) Appl. No.: 17/673,203

(22) Filed: Feb. 16, 2022

(65) Prior Publication Data

US 2023/0229932 A1 Jul. 20, 2023

Related U.S. Application Data

(60) Provisional application No. 63/300,428, filed on Jan. 18, 2022.

(51) Int. Cl.
*G06N 3/12* (2023.01)
*G06F 8/10* (2018.01)
*G06F 8/75* (2018.01)
*G06F 18/21* (2023.01)

(52) U.S. Cl.
CPC ............... *G06N 3/12* (2013.01); *G06F 8/10* (2013.01); *G06F 8/75* (2013.01); *G06F 18/217* (2023.01)

(58) Field of Classification Search
CPC .... G06N 3/12; G06F 8/10; G06F 8/75; G06F 18/217
See application file for complete search history.

(56) References Cited

U.S. PATENT DOCUMENTS

| 7,243,086 | B2 | 7/2007 | Polak | |
|---|---|---|---|---|
| 10,466,972 | B2 * | 11/2019 | Miyamoto | G06N 3/126 |
| 2014/0089891 | A1 * | 3/2014 | Reyes Lozano | G06F 8/30 717/106 |
| 2017/0262752 | A1 * | 9/2017 | Cantin | G06N 3/126 |
| 2021/0103434 | A1 * | 4/2021 | Venkat | G06F 16/2255 |

OTHER PUBLICATIONS

Terence Soule, An Analysis of the Causes of Code Growth in Genetic Programming, Sep. 2002, vol. 3, pp. 283-309 (Year: 2002).*

* cited by examiner

*Primary Examiner* — Wei Y Mui
*Assistant Examiner* — Amir Soltanzadeh
(74) *Attorney, Agent, or Firm* — Morrison & Foerster LLP

(57) ABSTRACT

A genetic algorithm system generates a set of computer programs and executes a process for assessment and conditional modification of the set, repeating the process over a plurality of generations to mutate the population of solutions over time. At each generation, the system scores each program in the set to generate a respective primary score adjustment, a respective secondary score adjustment, and a respective current score. If a current score for a program is less than or equal to a first threshold, the system removes the computer program from the set. If the current score is greater than or equal to a second threshold, the system modifies the computer program to generate one or more offspring programs for use in subsequent generations. If a primary score adjustment for a program is greater than or equal to a third threshold, the system selects the computer program for performance of a task.

28 Claims, 5 Drawing Sheets

SYSTEMS AND METHODS FOR AUTOMATICALLY GENERATING COMPUTER PROGRAMS BY MUTATING CODE WHILE ENSURING CODE VIABILITY

CROSS-REFERENCE TO RELATED APPLICATIONS

This application claims the priority of U.S. Provisional Application No. 63/300,428, filed Jan. 18, 2022, the entire contents of which are incorporated herein by reference.

FIELD

This relates generally to systems and methods for automatically generating computer programs, and more specifically systems and methods for automatically generating computer programs by algorithmically mutating code while ensuring code viability.

BACKGROUND

In computer science, genetic algorithms are a kind of metaheuristic used to generate or identify solutions by applying principles of natural selection. Given a population of potential solutions, the fittest solutions are selected for reproduction, and solutions for inclusion in a subsequent "generation" are generated based on the selected solutions. Over time, "natural selection," as simulated by the selection pressures exerted by the fitness assessment criteria, may cause the population of potential solutions to converge toward one or more desirable solutions.

SUMMARY

As explained above, genetic algorithms may be used to automatically generate solutions by allowing a population of potential solutions to "mutate" by selecting the fittest solutions to serve as the basis for generating subsequent generations of potential solutions. As used herein, the term "generation" (e.g., prior "generations," current "generation," subsequent generations") may be understood to refer to the repeating process of assessment and conditional modification of the set (or "colony") of potential solutions, wherein the set is assessed and conditionally modified and the modified set is used for the subsequent generation. Over many generations, optimized solutions may be attained. However, known systems for genetic algorithms have several drawbacks.

First, most known genetic algorithm systems are used only to mutate data sets that may serve as a solution. While mutation of data using a genetic algorithms approach has some advantages, mutation of data alone limits the potential applications of genetic algorithms approaches. Namely, mutation of data using a genetic algorithms approach does not enable a system to mutate computer program code itself (e.g., program code in a Turing-complete computer programming language), which means that genetic algorithm systems mutating data are not able to generate computationally-universal computer program code that is usable for complex applications.

Furthermore, using a genetic algorithm system mutating code presents several difficulties. In particular, using random or quasi-random mutation operations to generate "mutated" computer program code would be expected to generate, for an extraordinarily high percentage of mutations, non-viable code. Generating non-viable code for a high percentage of mutations would make the use of genetic algorithm systems time-consuming, inefficient, and computationally expensive.

Additionally, using known genetic algorithm systems to assess fitness of computer code would be computationally expensive, especially for large populations of complex computer programs.

Accordingly there is a need for improved genetic algorithm systems for using the principles of natural selection to assess and mutate populations of potential solutions comprising computer program code, wherein the mutation process modifies the computer program code itself. Specifically, there is a need for such systems that are capable of mutating computer program code in a way that mitigates the likelihood or prevalence of mutated solutions comprising non-viable code. Additionally, there is a need for such systems that are capable of assessing fitness of potential solutions comprising computer program code in a computationally efficient manner, allowing the system to be used to generate and assess large populations of potential solutions comprising complex computer program code.

Disclosed herein are genetic algorithm systems and methods that may address one or more of the above-identified needs. In some embodiments, a genetic algorithm system for mutating computer program code is provided. The system may instantiate a population of potential solutions (which may be referred to as "genomes") that comprise (or are constituted by) computer program code. The system may then execute a repeating process of assessment of the population and optional modification of the population, wherein each round of the process of assessment and optional modification of the population may be referred to as a "generation." At each new generation, modifications made to the population may include removal of solutions and/or generation of mutated solutions. Solutions that are assessed to have a low fitness (e.g., below a "death threshold") may be removed from the population for future generations, while solutions that are assessed to have a high fitness (e.g., above a "reproduction threshold") may be used to generate one or more mutated "offspring" solutions to be added to the population for future generations.

In some embodiments, a fitness assessment may be performed by assigning a respective fitness score to each solution in the population, wherein the fitness score may be adjusted up or down at each generation for which the solution is assessed. A primary score adjustment may be computed at each generation, wherein the primary score adjustment quantifies the accuracy of results computed using the solution. For example, a primary score adjustment may be generated based on executing the computer program code of a respective solution and assessing the performance (e.g., the output) of executing the program. Executing the computer program code may include using the code to compute result data, for example by testing the code using input data. The result data (generated by applying the computer program code to the input data) may then be compared to reference data comprising one or both of (a) a computed result calculated using a known algorithm or (b) a set of historical data (e.g., label data). Comparison of the result data to the reference data may be used to generate a primary score adjustment that characterizes performance of the computer program code, such that the closer the result data is to the reference data, the higher positive primary score adjustment for the computer program code. Comparison of the result data to reference data may be performed a plurality of times for a single solution per generation of the system, such that the primary score adjustment may characterize performance of the computer program code as measures across the plurality of comparisons. In some embodiments, the plurality of comparisons may each be referred to as experiments or instances.

Following calculation of the primary score adjustment for the current generation for the solution, a secondary score adjustment may be calculated. Secondary score adjustments may be based on factors other than accuracy of the results generated by the solution, for example one or more of the following: an adjustment based on a number of generations for which a solution has existed (counting its ancestor versions, from which it has descended) within the system (this concept may be referred to as the "age" of the solution); an adjustment based on script length, memory requirements, number of loops, and/or other measure of computational intensiveness and/or computation time for computer program code of the solution; an adjustment based on a total number of different solution "genomes" that currently exist in the population; an adjustment based on an amount of memory used by and/or available to the system; and/or an adjustment based on a similarity of the solution to one or more other solutions in the population.

Both the primary score adjustment for the current generation and the secondary score adjustment for the current generation—each of which may be positive or negative adjustments—may then be applied to (e.g., added to or subtracted from) the preexisting score of the solution to generate a current total fitness score for the solution. (The adjusted current total fitness score may be positive or negative.)

The primary score adjustment for a solution may be used to determine whether the solution is a "perfectly accurate" solution that generates result data equivalent to (or equivalent within an acceptable margin of error) the reference test data. (In some embodiments, the primary score adjustment for a solution may indicate that the result data is equivalent to the reference data across a plurality of comparisons (e.g., all comparisons) for the generation.) In such cases, the execution of generations may be ceased, and a the perfectly accurate solution may be selected for performance of a task, and/or may be outputted and displayed to a user of the system.

Furthermore, the total current score for a solution (reflecting both the primary score adjustment and secondary score adjustment as added to or subtracted from the solution's preexisting total score) may be used to determine whether to remove the solution from the population of solutions. For example, if the current score for a solution falls below a predetermined (or dynamically determined) "death threshold," then the solution may be removed from the set of potential solutions such that it is not included in future generations.

Furthermore, the total current score for a solution (reflecting both the primary score adjustment and secondary score adjustment as added to or subtracted from the solution's preexisting total score) may be used to determine whether to generate one or more offspring solutions based on the solution. For example if the current score for a solution falls above a predetermined (or dynamically determined) "reproduction threshold," then the solution may be used to generate one or more offspring solutions by attempting to apply one or more modification operations to the solution. The offspring solutions may then be included in the population for future generations, during which the offspring solutions may be assessed for fitness.

Generating offspring solutions may be performed in accordance with one or more randomization operations. In the example of solutions comprising computer program code, one or more randomization operations may be used to select a location in the code (e.g., by determining a line, a command, a character, a position, etc.) for modification, to select a modification operation to apply to the code (e.g., by determining whether to perform an insertion, a deletion, or a replacement), and/or to select a number of modifications to be applied to the code.

After selecting one or more modification operations (and one or more locations at which they are to be performed), the system may apply one or more processes configured to ensure that the generated offspring do not include non-viable code. In some embodiments, the modified code may be assessed to determine whether one or more code criteria are satisfied, for example by ensuring that the modified code would violate a stack size requirement, and/or that the modified code is free of one or more predefined impermissible command combinations (e.g., command combinations that are known to be inefficient). If it is determined that code criteria are not satisfied, then the system may determine whether one or more compensation operations can be applied to the modified ode to generate a further-modified version of the code that does satisfy the code criteria. If so, the compensation operation(s) may be applied to generate a further-modified version of the offspring; and if not, the original modification may be reverted and a new modification may be selected (e.g., randomly), the modification may be abandoned, and/or the offspring itself may be abandoned. By apply said safeguards to ensure that the generated offspring do not include non-viable code, the efficiency of the system may be greatly improved by ensuring that the population does not become bloated with a massive portion of non-viable solutions, as could be statistically likely to happen without the presence of any safeguards.

After one or more offspring solutions are created, they may be added to the population of solutions for assessment at future generations. Scores from previous generations for preexisting potential solutions may be carried over to subsequent generations, and the process may repeat until convergence, for example until one or more primary score adjustments indicate that one or more of the solutions has generated results data that matches the reference data against which it is assessed. In some embodiments, achievement of a "perfect" primary score adjustment for one or more solutions may cause execution of generations to automatically cease. In some embodiments, achievement of a "perfect" primary score adjustment for a solution, as computed across all (or a sufficient threshold number or threshold percentage of) experiments (e.g., instances) for the solution, may cause execution of generations to automatically cease. In some embodiments, execution of generations may continue such that the system may attempt to generate one or more solutions that also has a "perfect" primary score adjustment but that is more efficient than previously-generated perfect-primary-score-adjustment solutions, for example by way of having a shorter script length than previously-generated perfect-primary-score-adjustment solutions.

In order to further improve processing efficiency, the system may be configured to leverage both a CPU (central processing unit) and a GPU (graphics processing unit). As described below, system performance may be optimized by allocating certain tasks to CPU and certain tasks to GPU. For example, execution of potential solutions, comparison of results data to reference data to generate primary score adjustments, and computation and application of one or more secondary score adjustments, may be performed by GPU. Meanwhile, conditional removal of potential solutions from the population, conditional generation of one or more offspring solutions to be added to the population, and conditional determination that a solution has achieved "perfect" primary score adjustment may be performed by CPU. While not all processing operations can be performed by GPU, allocating appropriate tasks for GPU, as described herein, can afford vast improvements to efficiency and performance.

In some embodiments, a first system, for automatically generating computer programs, is provided, the first system comprising one or more processors configured to: generate a set of computer programs, wherein the set comprises a plurality of computer programs; and execute a process for assessment and conditional modification of the set of computer programs by, for each of the computer programs in the set of computer programs: applying a scoring function to the computer program to generate a respective primary score adjustment, a respective secondary score adjustment, and a respective current score based on the respective primary score adjustment and on the respective secondary adjustment; if the respective current score is less than or equal to a first threshold, removing the computer program from the set of computer programs; if the respective current score is greater than or equal to a second threshold, generating one or more offspring computer programs, for use in one or more subsequent generations of the process for assessments and conditional modifications of the set of computer programs, by modifying one or more commands in code of the computer program, and add the one or more offspring computer programs to the set of computer programs; and if the respective primary score adjustment is greater than or equal to a third threshold, selecting the computer program for performance of a task.

In some embodiments of the first system, the one or more processors are configured to, if none of the respective primary score adjustments are greater than or equal to the third threshold, execute a subsequent generation of the process for assessments and conditional modifications of the set of computer programs, wherein the subsequent generation is based on the set of computer programs following removal of any computer programs that did not satisfy the first threshold and following addition of any newly generated offspring computer programs.

In some embodiments of the first system, the one or more processors are configured to, at each subsequent generation, generate one or more new computer programs, and add the one or more new computer programs to the set of computer programs.

In some embodiments of the first system, respective current scores for each computer program of the set of computer programs are carried over from current generations to a subsequent generations and are modified by score adjustments at future generations.

In some embodiments of the first system, executing the process for assessments and conditional modifications of the set of computer programs comprises, for each computer program of the set of computer programs comprises, if the respective current score is greater than or equal to the second threshold, reducing the respective current score for a subsequent generation in accordance with a number of the one or more offspring computer programs that are generated by modifying commands in the code of the computer program.

In some embodiments of the first system, applying the scoring function comprises: computing result data using the computer program; comparing the result data against reference data to generate the primary score adjustment, wherein the primary score adjustment characterizes an accuracy of the result data; and determining the secondary score adjustment; and adjusting a respective previous score for the computer program, based on the primary score adjustment and the secondary score adjustment, to generate the respective current score.

In some embodiments of the first system, the reference data is retrieved from a database of historical data.

In some embodiments of the first system, the reference data is computed based on a reference algorithm.

In some embodiments of the first system, comparing the result data against the reference data comprises computing and comparing respective absolute values of the result data and the reference data.

In some embodiments of the first system, comparing the result data against the reference data to generate the primary score adjustment comprises applying a penalty if the result data incorrectly indicates that there is no valid solution.

In some embodiments of the first system: computing result data comprises computing a plurality of instances of result data; the reference data comprises a plurality of instances of reference data; and comparing the result data against reference data comprises comparing the plurality of instances of result data pairwise against the plurality of instances of reference data.

In some embodiments of the first system, the secondary score adjustment is based at least in part on a number of generations for which the computer program has existed in the set.

In some embodiments of the first system, the secondary score adjustment is based at least in part on an amount of machine-time required to execute the computer program.

In some embodiments of the first system, the secondary score adjustment is based at least in part on a total number of computer programs currently in the set of computer programs.

In some embodiments of the first system, the secondary score adjustment is based at least in part on an amount of memory being used by the system.

In some embodiments of the first system, the secondary score adjustment is based at least in part on a similarity of the computer program to one or more other computer programs in the set.

In some embodiments of the first system, generating the one or more offspring computer programs by modifying one or more commands of the code of the computer program comprises making, in the code of the offspring computer program, one or more insertions, deletions, or replacements of a command as compared to the code of the computer program.

In some embodiments of the first system, making the one or more insertions, deletions, or replacements comprises randomly determining whether to make an insertion, a deletion, or a replacement.

In some embodiments of the first system, making the one or more insertions, deletions, or replacements comprises randomly determining a location in the code at which to make the one or more insertions, deletions, or replacements.

In some embodiments of the first system, generating the one or more offspring computer programs by modifying the code of the computer program comprises: determining whether the one or more insertions, deletions, or replacements for the code of the offspring computer program satisfy one or more code criteria; if the one or more code criteria are not satisfied, determine whether a compensation modification can be applied to correct the code of the offspring computer program; if the one or more compensation modifications can be applied, further modify the code of the offspring computer program using the compensation modification; and if the one or more compensation modifications cannot be applied, revert the one or more insertions, deletions, or replacements.

In some embodiments of the first system, determining whether the one or more code criteria are satisfied comprises determining whether the modified code would violate a stack size requirement.

In some embodiments of the first system, determining whether the one or more code criteria are satisfied comprises determining whether the modified code is free of one or more predefined inefficient command combinations.

In some embodiments of the first system, applying the scoring function is performed by a GPU of the one or more processors.

In some embodiments of the first system, the conditional removal of the computer program, the conditional generating of one or more offspring, and the conditional causing display of the indication that the third threshold has been satisfied are performed by a CPU of the one or more processors.

In some embodiments of the first system, executing the process for assessments and conditional modifications of the set of computer programs comprises, for each of the computer programs in the set of computer programs, if the respective primary score adjustment is greater than or equal to the third threshold, cease executing generations of the process.

In some embodiments of the first system, executing the process for assessments and conditional modifications of the set of computer programs comprises, for each of the computer programs in the set of computer programs, if the respective primary score adjustment is greater than or equal to the third threshold, continue executing generations of the process until a new computer program having a respective primary score adjustment greater than or equal to the third threshold and having a length that is shorter than that of the computer program is generated.

In some embodiments, a first method, for automatically generating computer programs, is provided, the first method performed by a system comprising one or more processors, the first method comprising: generating a set of computer programs, wherein the set comprises a plurality of computer programs; and executing a process for assessment and conditional modification of the set of computer programs by, for each of the computer programs in the set of computer programs: applying a scoring function to the computer program to generate a respective primary score adjustment, a respective secondary score adjustment, and a respective current score based on the respective primary score adjustment and on the respective secondary adjustment; if the respective current score is less than or equal to a first threshold, removing the computer program from the set of computer programs; if the respective current score is greater than or equal to a second threshold, generating one or more offspring computer programs, for use in one or more subsequent generations of the process for assessments and conditional modifications of the set of computer programs, by modifying one or more commands in code of the computer program, and add the one or more offspring computer programs to the set of computer programs; and if the respective primary score adjustment is greater than or equal to a third threshold, selecting the computer program for performance of a task.

In some embodiments, a first non-transitory computer-readable storage medium, storing instructions for automatically generating computer programs, is provided, wherein the instructions are configured to be executed by one or more processors of a system to cause the system to: generate a set of computer programs, wherein the set comprises a plurality of computer programs; and execute a process for assessment and conditional modification of the set of computer programs by, for each of the computer programs in the set of computer programs: applying a scoring function to the computer program to generate a respective primary score adjustment, a respective secondary score adjustment, and a respective current score based on the respective primary score adjustment and on the respective secondary adjustment; if the respective current score is less than or equal to a first threshold, removing the computer program from the set of computer programs; if the respective current score is greater than or equal to a second threshold, generating one or more offspring computer programs, for use in one or more subsequent generations of the process for assessments and conditional modifications of the set of computer programs, by modifying one or more commands in code of the computer program, and add the one or more offspring computer programs to the set of computer programs; and if the respective primary score adjustment is greater than or equal to a third threshold, selecting the computer program for performance of a task.

In some embodiments, a second system, for modifying computer program code, is provided, the second system comprising one or more processors configured to: generate a computer program comprising a plurality of commands; generate a modified version of the computer program by randomly selecting a modification operation and performing the randomly selected modification operation to modify one or more commands in code of the computer program; determine whether the modified computer program satisfies one or more code criteria; if the one or more code criteria are not satisfied, determine whether a compensation modification can be applied to correct the code of the modified version of the computer program; if the one or more compensation modifications cannot be applied, revert the modified version of the computer program to its state before the modification operation; and if the one or more compensation modifications can be applied, further modify the code of the modified version of the computer program using the compensation modification, to generate improved modified code.

In some embodiments of the second system, determining whether the one or more code criteria are satisfied comprises determining whether the modified version of the computer program would violate a stack size requirement.

In some embodiments of the second system, the stack size requirement comprises one or more of the following: a requirement for a final stack size at the end of execution of the computer program; a command-specific requirement for execution of a command within the code; and a requirement that the stack size not drop below zero at any point during execution of the computer program.

In some embodiments of the second system, determining whether the modified version of the computer program would violate the stack size requirement comprises assessing a respective stack effect associated with one or more respective commands in the code.

In some embodiments of the second system, determining whether the one or more code criteria are satisfied comprises determining whether the modified version of the computer program is free of one or more predefined inefficient commands.

In some embodiments of the second system, the one or more processors are configured to use a randomization operation to determine a portion of the code to which to apply the randomly selected modification operation.

In some embodiments of the second system, randomly selecting the modification operation comprises using a randomization operation to choose to perform one of the following: an insertion of a command in the code, a deletion of a command in the code, and a replacement of a command in the code.

In some embodiments of the second system, inserting a command in the code comprises using a randomization operation to select one of the following commands for insertion: a load command, a constant command, an add command, a subtract command, a multiply command, a divide command, a duplicate command, a flip sign command, a square root command, a cube root command, a square command, a copy command, and a swap command.

In some embodiments, a second method, for modifying computer program code, is provided, the second method performed by a system comprising one or more processors, the second method comprising: generating a computer program comprising a plurality of commands; generating a modified version of the computer program by randomly selecting a modification operation and performing the randomly selected modification operation to modify one or more commands in code of the computer program; determining whether the modified computer program satisfies one or more code criteria; if the one or more code criteria are not satisfied, determining whether a compensation modification can be applied to correct the code of the modified version of the computer program; if the one or more compensation modifications cannot be applied, reverting the modified version of the computer program to its state before the modification operation; and if the one or more compensation modifications can be applied, further modifying the code of the modified version of the computer program using the compensation modification, to generate improved modified code.

In some embodiments, a second non-transitory computer-readable storage medium, storing instructions for modifying computer program code, is provided, the instructions configured to be executed by a system comprising one or more processors to cause the system to: generate a computer program comprising a plurality of commands; generate a modified version of the computer program by randomly selecting a modification operation and performing the randomly selected modification operation to modify one or more commands in code of the computer program; determine whether the modified computer program satisfies one or more code criteria; if the one or more code criteria are not satisfied, determine whether a compensation modification can be applied to correct the code of the modified version of the computer program; if the one or more compensation modifications cannot be applied, revert the modified version of the computer program to its state before the modification operation; and if the one or more compensation modifications can be applied, further modify the code of the modified version of the computer program using the compensation modification, to generate improved modified code.

In some embodiments, any one or more of the characteristics of any one or more of the systems, methods, and/or computer-readable storage mediums recited above may be combined, in whole or in part, with one another and/or with any other features or characteristics described elsewhere herein.

DETAILED DESCRIPTION

Described herein are systems and methods for automatically generating computer programs by mutating code while ensuring code viability. In some embodiments, the systems provided herein include specialized genetic algorithm systems that are configured to mutate code itself of potential solutions, rather than merely mutating data to which code may be applied. Furthermore, the systems provided herein may include specialized genetic algorithm systems that apply one or more safeguards to encourage or ensure the viability of code that is generated according to one or more random or quasi-random processes, thereby increasing efficiency of the system by ensuring that a population of potential solutions is not bloated with a large share of non-viable mutated code. The systems and methods disclosed herein may address the one or more of the problems and shortcomings of known genetic algorithm systems and methods as described above.

Figure 1:
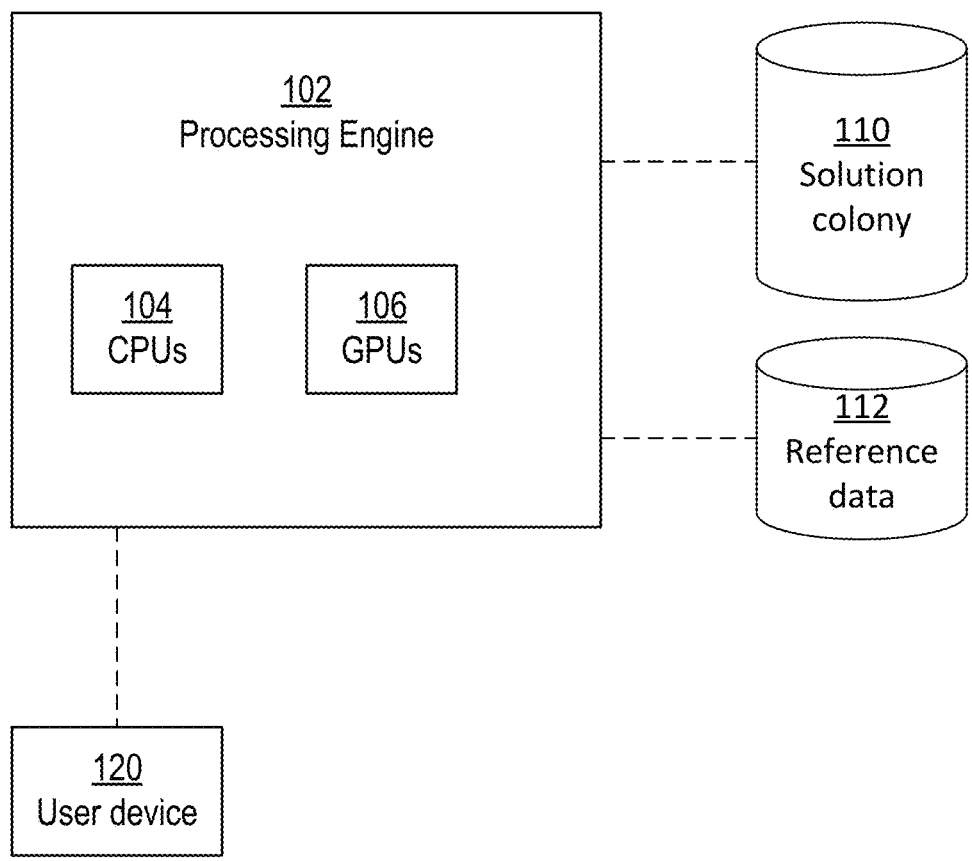
FIG. 1 depicts a genetic algorithm system for automatically generating computer programs by mutating code while ensuring code viability, in accordance with some embodiments.

FIG. 1 depicts a system 100 for automatically generating one or more computer programs by mutating code while ensuring code viability, in accordance with some embodiments. System 100 may be referred to as a specialized genetic algorithm system. As described in detail herein, system 100 may be configured to automatically generate a set of potential solutions comprising computer program code, to evaluate the set of potential solutions, and to conditionally update the set of potential solutions by removing solutions deemed to be unfit and by generating "offspring" potential solutions based on solutions deemed to be fit, and to repeat the evaluation and conditional modification steps using the updated set of solutions. The offspring solutions may be created by modifying code—e.g., modifying commands in computer program code—included in or constituting one of the potential solutions. Modification of code of one or more of the potential solutions may be carried out in accordance with one or more randomization operations, but may be subject to one or more safeguards to encourage or ensure that modifications to the code do not produce non-viable code. By repeatedly updating and reevaluating the set of potential solutions in this manner over a number of generations, the set of solutions may converge toward one or more optimized solutions comprising computer program code that is well-suited to perform a target task, such as by accurately modeling a target set of data and/or accurately approximating a target function.

System 100 may be a computerized system including one or more processors (including CPUs and/or GPUs), one or more computer storage mediums, one or more communication devices, and one or more input/output devices. While the components of system 100 are shown, by way of example, in a particular arrangement in FIG. 1, a person of ordinary skill in the art will appreciate, in light of the disclosure herein, that one or more components of system 100 may be combined, provided by multiple separate systems, provided by a single system, and/or provided in a distributed arrangement. In some embodiments, one or more of the data processing functionalities of the various components of system 100 may be provided by a single processor, by a plurality of processors, and/or by a distributed processing system. In some embodiments, one or more of the data storage functionalities of the various components of system 100 may be provided by a single computer storage device (e.g., a single database or RAM), by a plurality of computer storage devices, and/or by a distributed computer storage system.

In the exemplary arrangement shown in FIG. 1, system 100 may include processing engine 102, solution colony data 110, reference data 112, and user device 120.

Processing engine may 102 comprise one or more computer processors configured to perform one or more of the data processing functionalities described herein. In some embodiments, processing engine 102 may be provided as a local processor or set of processors, and/or as a web-hosted processor or set of processors (e.g., distributed processors). In some embodiments, processing engine may include one or more central processing units (CPUs) such as CPUs 104 and one or more graphics processing units (GPUs) such as GPUs 106. As described herein, different processing tasks for instantiating, evaluating, and modifying a colony potential solutions comprising program code, as part of a specialized genetics algorithm technique, may be allocated between CPUs 104 and GPUs 106 in order to improve system efficiency. In some embodiments, management of the colony of solutions—including generating program code for the potential solutions, removing one or more potential solutions that is assessed to be unfit, and/or modifying program code for offspring potential solutions—may be carried out by CPUs 104. Meanwhile, execution and assessment of potential solutions—including executing program code of potential solutions, comparing generated result data to reference data, generating a primary score adjustment quantifying performance of a potential solution, generating a secondary score adjustment of a potential solution, and generating a current total score for a potential solution including applying the primary and secondary score adjustments—may be carried out by GPUs 106. In some embodiments, when multiple comparisons (e.g., multiple experiments) are run for a potential solution, different comparisons (e.g., different instances of comparison made as part of different experiments) may be allocated to different respective GPU threads, and GPU may further be responsible for collectively processing the results of multiple comparisons to combine the results (e.g., of all 128 comparisons) and to generate an overall primary score adjustment. In some embodiments, GPU can calculate primary score adjustments while CPU can calculate secondary score adjustments; in some embodiments, GPU can calculate both primary score adjustments and secondary score adjustments.

In some embodiments, division of labor between GPU(s) and CPU(s) may allow for simultaneous processing for different tasks by the CPU and GPU. Furthermore, GPU may provide about three orders of magnitude improved performance for tasks that can be allocated to GPU. However, not all tasks can be allocated to GPU, and certain tasks may be required to be run on CPU for reasons including (but not limited to), the following examples: GPU may lack sufficient memory to store an entire colony of solutions; GPU may be unable to access I/O devices to interact with a user; GPUs do not have stack or heap, so memory allocation for GPU may need to be done by CPU; GPUs are only efficient in situations where all cores are running the same or similar code. Allocations of tasks between GPU and CPU as described herein may be consistent with these considerations.

Solution colony 110 may include all or part of the data constituting a set—e.g., a "colony"—of potential solutions, as used to perform repeated assessment and optional updating of the set of potential solutions to identify optimized solutions according to the specialized genetic algorithms techniques described herein. Solution colony 110 may be stored by any suitable computer storage medium and in any suitable format, such as being provided as a part of one or more databases or RAM.

In some embodiments, solution colony 110 may include data representing each of a plurality of solutions, which may be referred to as "genomes," each of which may constitute computer program code forming all or part of the potential solution. Computer program code forming all or part of a solution in the colony may include code in any suitable programming language, including a Turing-complete programming language.

In some embodiments, in addition to the substantive data (e.g., the code) forming the solutions themselves, colony data 110 may include metadata associated with one or more of the potential solutions and/or associated with the entire colony of potential solutions. Metadata may include any data usable in assessing performance of one or more potential solutions, including results data generated by executing a solution, and/or including score data (e.g., total score data, primary score adjustment data, and/or secondary score adjustment data) reflecting performance/assessment of one or more solutions as describe further herein. Additionally, metadata may include information tracking evolution of the colony over time (e.g., statistics regarding the number of solutions included in the colony for one or more generations, the number of generations for which a certain solution's ancestral line has been present in the colony, the number of offspring attributable to a certain solution at a certain generation, and/or score data (including total score data, primary score adjustment data, and/or secondary score adjustment data) for one or more solutions for one or more of the generations for which the solution has been assessed.

As shown in FIG. 1, solution colony 110 may be configured such that it is communicatively coupled (e.g., via one or more wired or wireless network communication interfaces) to processing engine 102. System 100 may be configured such that some or all of the data of solution colony data 110 may be communicated to processing engine 102 for processing as described herein. Namely, processing engine 102 may be configured to operate on data of solution colony 110 to assess and score solutions represented therein and to accordingly update the set of solutions, including by removing unfit solutions and by generating offspring based on fit solutions.

Reference data 112 may include data usable by system 100 for evaluation of fitness (e.g., performance) of one or more solutions, such as the solutions represented in solution colony 110. For example, reference data 112 may include reference algorithms or other known techniques for generating solution data to problems for which system 100 is attempting to generate an exact solution, approximation, or model. In another example, reference data 112 may include historical (e.g., real-world) data for which system 100 is attempting to generate a model. In some embodiments, reference data 112 may be compared to result data that is generated using one or more of the solutions (e.g., computer programs) stored in solution colony 110. For example, input data may be selected (e.g., randomly) and provided as input to a one of the solutions of solution colony 110, thereby generating result data. In some embodiments, this result data may then be compared either to historical (e.g., real-world data) included reference data 112. In some embodiments, this result data may be compared to a reference solution included in reference data 112 that is generated by providing the same input to one or more known algorithms or formulas. In this manner, a difference (or lack thereof) between the result data of the potential solution, as compared to the reference data, may be determined. As described in further detail herein, fitness of the solution (e.g., of the computer program code forming part of the "genome") may be assessed based in whole or in part on this difference (or lack thereof).

As shown in FIG. 1, reference data 112 may be configured such that it is communicatively coupled (e.g., via one or more wired or wireless network communication interfaces) to processing engine 102. System 100 may be configured such that some or all of reference data 112 may be communicated to processing engine 102 for processing as described herein. Namely, processing engine 102 may be configured to operate on reference data 112 to assess and score solutions represented in solution colony 110.

User device 120 may include any one or more computers or computer systems, such as one or more personal computers, laptops, tablets, smart phones, mobile electronic devices, workstations, or the like. User device 120 may include one or more user input devices (e.g., keyboard, mouse, touch screen, microphone) configured to accept user inputs, and may include one or more displays configured to display information regarding processing of data by processing engine 102. In some embodiments, user device 120 may display a graphical user interface that allows a user to monitor the execution by engine 102 of the techniques described herein. In some embodiments, a user may be able to use said user interface to enter one or more inputs to configure system 100, such as by setting one or more parameters for executing a specialized genomic algorithms technique as described herein, such as: one or more threshold levels, colony size (e.g., initial colony size, maximum colony size), solution characteristics (e.g., what computer program language should be used for solutions), reference data to be used for evaluation of solutions, code criteria to be used in constraining evolution of the colony, and/or parameters to be applied in computing scores adjustments when assessing solutions (including by selecting which adjustments should be applied and/or by specifying how strongly one or more adjustments should be weighted).

Figure 2A:
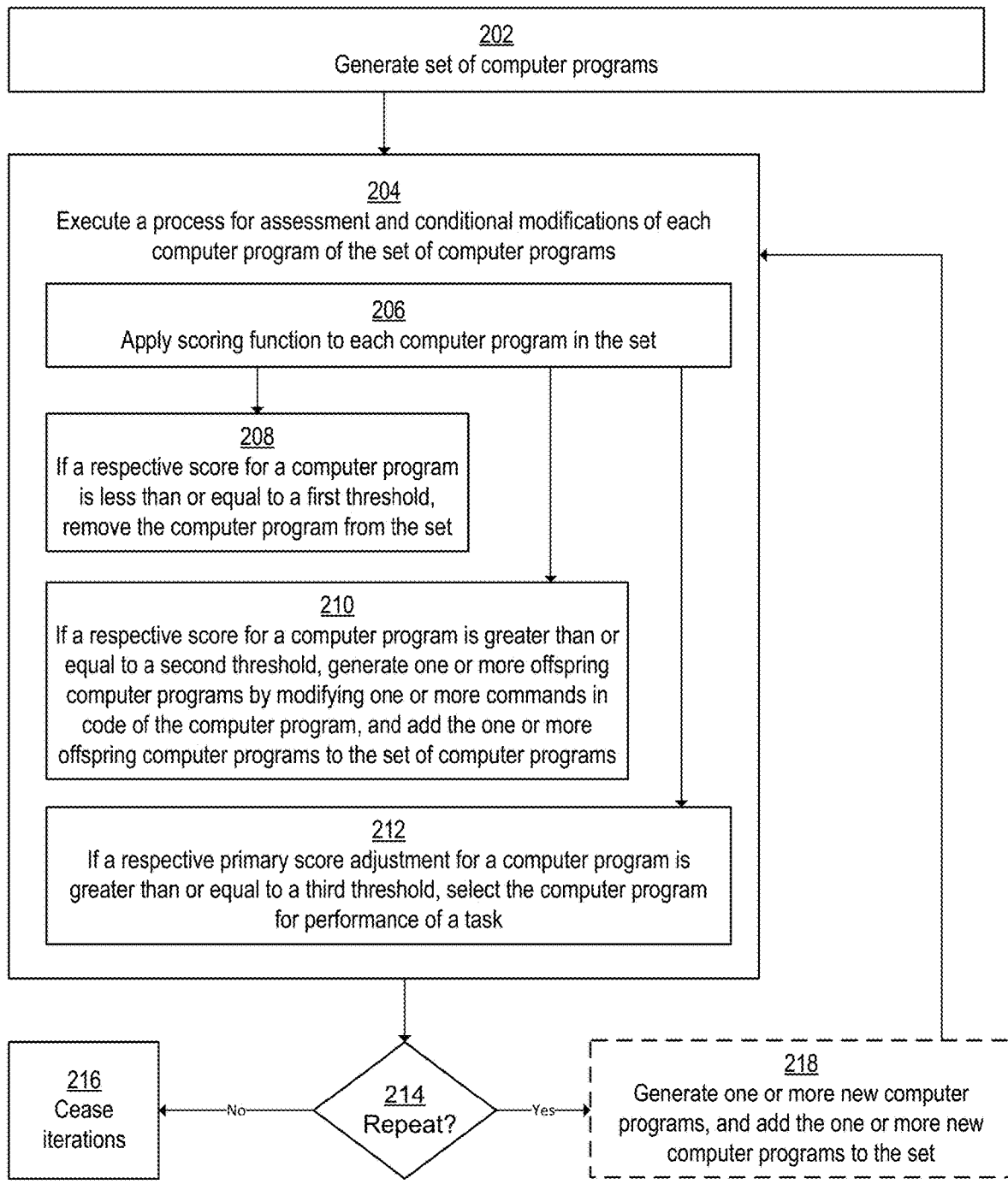
FIGS. 2A-2C depict a method for automatically generating computer programs by mutating code while ensuring code viability, in accordance with some embodiments.
Figure 2B:
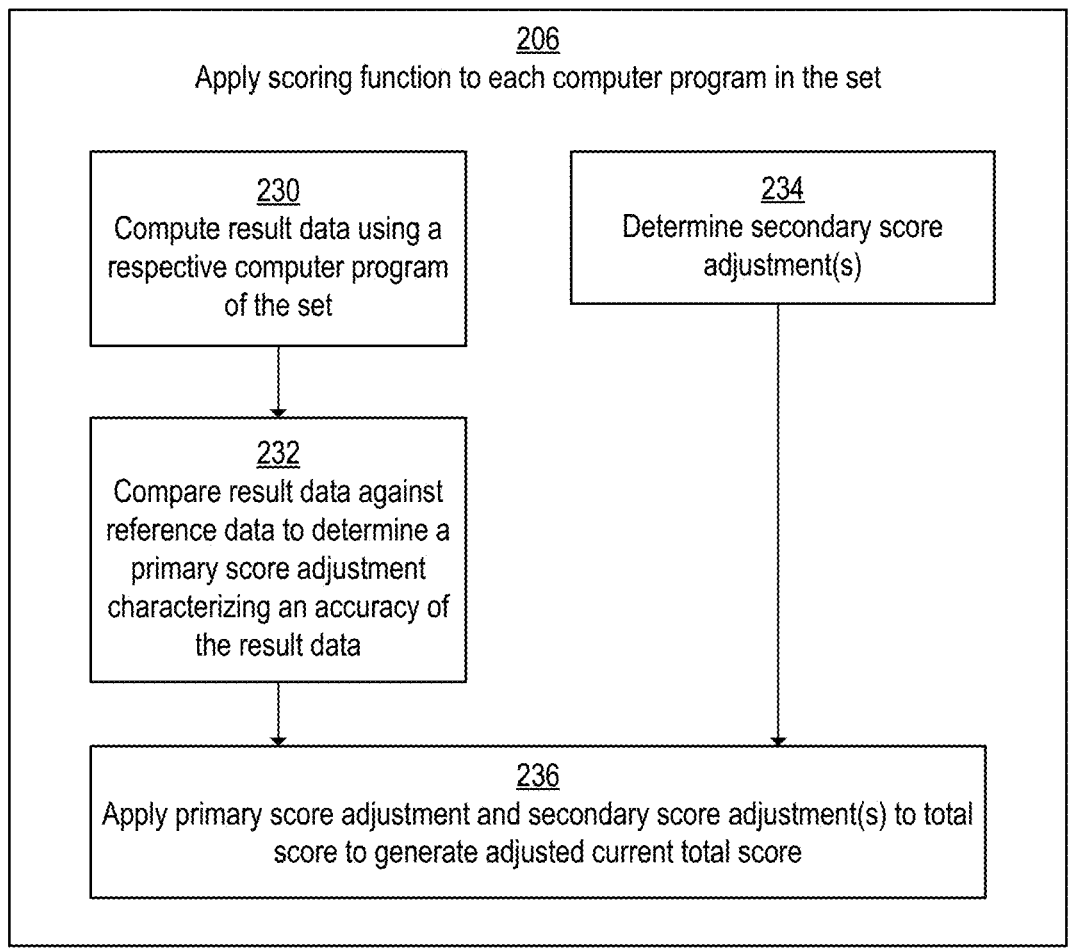
Figure 2C:
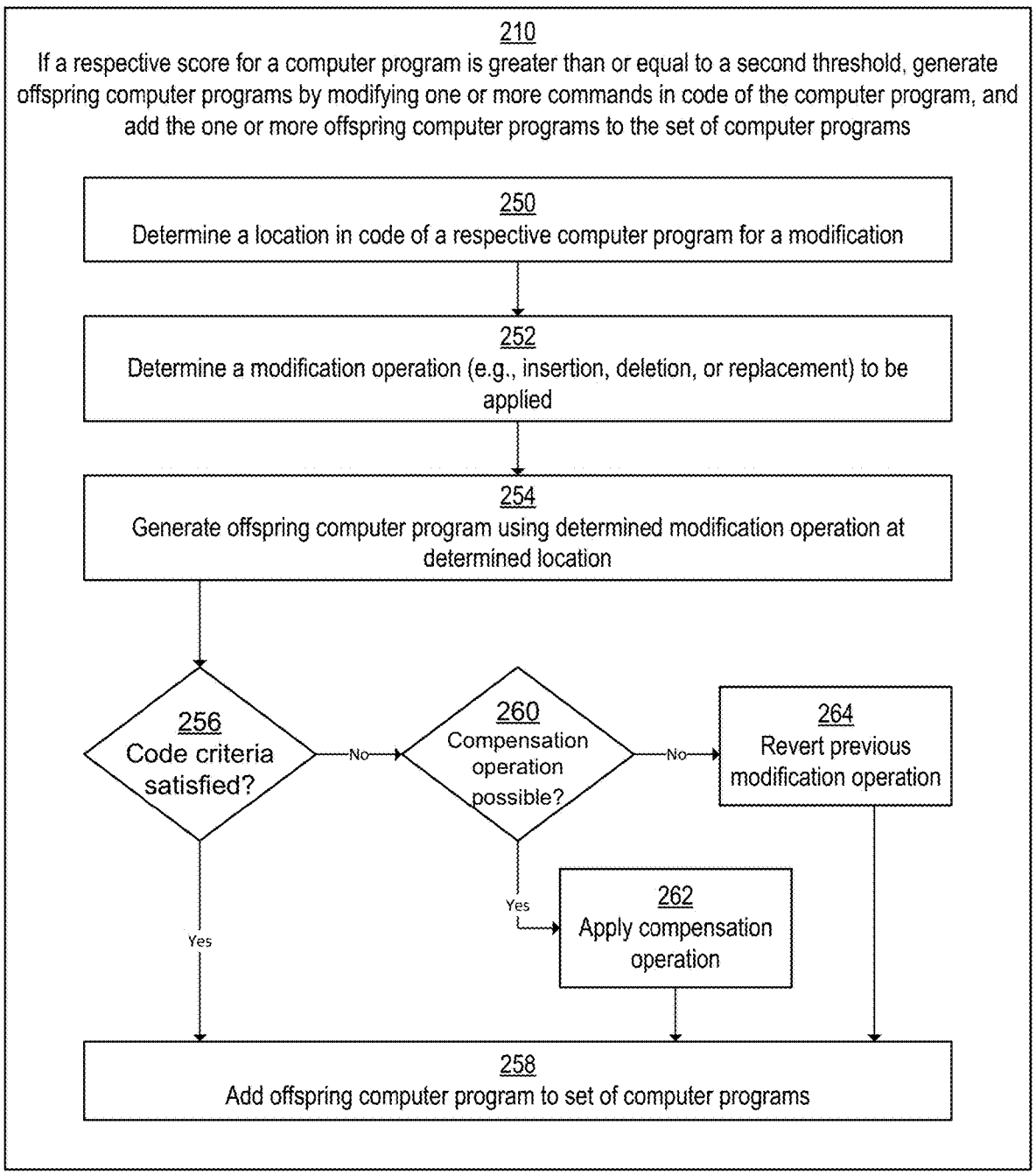

FIGS. 2A-2C depict a method 200 for automatically generating computer programs by mutating code while ensuring code viability, in accordance with some embodiments. Specifically, FIG. 2A depicts a specialized genetic algorithms overall process flow for method 200, FIG. 2B depicts an optional sub-process for applying a scoring function as a part of the specialized genetic algorithms process, and FIG. 2C depicts an optional sub-process for mutating code while ensuring code viability as a part of the specialized genetic algorithms process. In some embodiments, method 200 may be performed by a system for automatically generating one or more computer programs by mutating code while ensuring code viability, such as system 100 as described above.

At block 202, in some embodiments, the system may generate a set of computer programs. In the example of system 100, block 202 may be executed by CPUs 104 of processing engine 102 of system 100. In some embodiments, a system may initialize a process for applying a specialized genetics algorithm technique by receiving and/or generating data for one or more solutions that form a colony of potential solutions to be "evolved" by the system over a series of generations until one or more convergence conditions are satisfied. The set of solutions—e.g., a "colony"—may be stored in any suitable manner, for example by being stored in memory of the system and/or by being stored in one or more databases accessible to the system.

In some embodiments, generating the set of computer programs at block 202 may include receiving one or more preexisting solutions, e.g., from an external data source. Alternatively or additionally, the system may generate one or more solutions for inclusion in the set. Generating initial solutions for inclusion in the set may comprise generating said solutions based on one or more predefined system configurations, one or more user inputs, and/or one or more randomization operations.

In some embodiments, as described herein, the one or more solutions (e.g., "genomes") generated for inclusion in the set (e.g., the "colony") may include (and/or may be constituted entirely by) computer program code. For example, the solutions may themselves be executable computer programs. In some embodiments, the computer program code included in one or more solutions may include code in any suitable computer programming language, including program code in a Turing-complete computer programming language.

In some embodiments, efficiency (e.g., computational efficiency) of the system may be improved when computer program code included in the solutions is expressed in a specialized computer programming language. Use of a specialized computer programming language may improve system efficiency by ensuring a higher degree of viable code for randomly-generated computer programs. For example, a specialized language may be used for which greater than a predefined percentage (e.g., greater than 50%, 60%, or 70%) of any randomly-generated code is viable. (Code viability may include, for example, the condition that code can be analyzed and/or compiled and that execution of the code will not cause any stack overflows, other stack errors, divisions by zero, infinite loops, or other errors.) In some embodiments, for a specialized language, greater than a predefined percentage of any randomly-generated code of a predefined code length (e.g., as defined by a number of characters, a number of lines, a number of commands, a runtime for execution, and/or an amount of memory required for execution) is viable.

In some embodiments, a computer programming language used by the system may be (or may share one or more characteristics in common with) an assembly language. In some embodiments, the language may use reverse polish notation (RPN).

In some embodiments, the computer programming language may have a predefined set of available commands that may be used. For example, available commands in the programming language may include:
  a load variable command
  a define constant command
  an add command
  a subtract command
  a multiply command
  a divide command
  a duplicate value command
  a flip-sign command
  a square-root command
  a cube-root command
  a variable-order root command a square command a cube command a variable-order exponent command a swap command a paste command and a copy command (an adjunct command associated with the paste command)

In some embodiments, the copy and paste commands may be used as a unique implementation of variables, in that the system may "copy" the top of the stack into a variable, then "paste" that variable, and once the variable is "pasted" it is gone. A pair of copy and paste commands may always be treated together as an unbreakable pair. This may be done to facilitate mutations.

The commands in the programming language may respectively fall into one or more of several command-type categories. For example, command types may include a "command only" command type (e.g., an add command, a multiply command), a "command plus double" command, and a "command plus index" command. Commands of the "command plus double" command type may include a floating point number. Commands of the "command plus integer" command type may include an index. The "command plus index" command type may include one or more commands configured to cause the system to call from a set of variable and/or to copy/paste to/from a clipboard.

The commands in the programming language may be respectively associated with a "stack effect," which may be expressed as either "−1", "0", or "1". The stack effect for a command may indicate the command's effect on the stack size during execution of code using the command. For example, an add command may have a stack effect of −1, because it combines the two lowermost values on the stack; a load command may have a stack effect of +1, because it adds a new value to the bottom of the stack and pushes other values upwards in the stack; and a sign command may have a stack effect of 0, because it changes the lowermost value in the stack without adding or removing any values from the stack.

Furthermore, commands in the programming language may be respectively associated with a minimum stack size requirement, which is a minimum size of the stack required for execution of the command to be viable. For example, an add command may have a minimum stack size requirement of 2, because it requires two values to be summed; a load command may have a minimum stack size of 0, because it does not need to operate on any preexisting values in the stack; and a sign command may have a minimum stack size of 1, because it needs at least one value in the stack to operate on by flipping its sign.

During or prior to execution of code that is written using the programming language, the system may evaluate stack effects and stack size requirements of the various commands in the code, such that the stack size at each step of execution of the code (at execution of each command) may be determined. This evaluation may determine whether minimum stack size requirements for a next command are met; if minimum stack size requirements for a next command are not met, then the code may be considered nonviable. Furthermore, the code may be considered nonviable if the stack size drops below zero at any point during execution of the code.

In some embodiments, compliance with minimum stack size requirements (including requirements for a global minimum stack size at any step of evaluation, and including requirements for minimums stack size for a specific command) may be ensured as part of the process of generating code for the solutions included in the population to be assessed and evolved. For example, the system may use one or more random processes to select and arrange commands to be included in code of a solution, but may ensure that only commands resulting in viable execution in consideration of stack size requirements are selected. For example, the system may evaluate a current stack size and may (randomly) select a next command from a subset of all available commands whose minimum stack size requirements are met by the current stack size. Furthermore, the system may evaluate a current stack size and may (randomly) select a next command from a subset of commands whose stack effect will not cause the stack size to drop below a global minimum stack size.

In some embodiments, the system may be configurable such that a user may selectively enable or disable one or more commands, such that only certain commands from a set of all available commands in the programming language may be usable by the system. The system may then (randomly) select from only the indicated-available subset when generating code for the solutions (e.g., the "genomes") in the population. This may be done to speed up evolution, because disabling commands known to not be needed may improve efficiency of evolution.

In some embodiments, the system may be configured to instantiate a predefined (or dynamically determined) initial number of computer programs for inclusion in the colony. The initial number of programs may user-selectable. An initial colony population may be set to a specific number, e.g., 100, 500, 1000, or 5000. In some embodiments, rather than a predefined fixed number of computer programs initially generated to instantiate the colony, a number of programs for instantiation of the colony may be selected based on an amount of memory or other storage resources available to the system, based on computing resources available to the system, and/or based on computational resources and/or storage resources required for execution (e.g., as estimated based on complexity and length of the code) of the programs in the colony.

After the initial population of solutions has been instantiated, the system may begin the repeatable, looping process of evaluating the solutions and conditionally updating the population by removing unfit solutions and generating offspring solutions, as described in further detail below.

At block 204, in some embodiments, the system may execute a process for assessment and conditional modifications of each of the computer programs of the set of computer programs. The process of assessment and conditional modification may include, for each of the solutions in the population, evaluating the solution and taking one or more conditional actions based on the outcome of the evaluation. The evaluation may seek to quantify an overall fitness of the solution for a target task, which may be measured by comparing performance of the solution against performance of a known formula/algorithm, and/or by comparing performance of the solution against historical (e.g., real-world) data. As described below, fitness of a respective solution may be quantified (with or without one or more adjustments applied to said quantification), and the quantification for the respective solution may be compared to one or more thresholds to determine whether one or more conditional actions should be taken, wherein the conditional actions may include removing the solution from the population, adding to the population one or more offspring solutions based on the solution, and/or selecting the solution as a convergence-condition solution for performance of a task.

In the example of system 100, block 204 may be executed by one or both of CPUs 104 and GPUs 106 of system 100. In some embodiments, execution of code as part of assessing fitness of solutions in the colony may be performed by GPUs 106, while determination of a fitness score, adjustment of the fitness score, comparison of the fitness score to one or more thresholds, and updating the solutions (e.g., mutating the code) included in the colony may be performed by CPUs 104. This division of labor may optimize performance of the system in consideration of certain limitations of GPU architecture.

Blocks 206-212, described below, depict sub-processes that may be performed as part of the assessment and conditional modification process of block 204.

At block 206, in some embodiments, the system may apply a scoring function to each computer program in the set. In some embodiments, the scoring function may quantify a fitness level of the computer program according to one or more criteria. The scoring function may assess whether the computer program is suited to carry out an intended purpose or function, such as reproducing or closely approximating a known function or algorithm, or modeling a data set according to one or more variables.

In some embodiments, applying the scoring function may comprise assigning a score that is generated entirely based on performance of the computer program and adjustments applied within a single generation of the genetic algorithms technique. In some embodiments, applying the scoring function may comprise assigning a score that is generated by increasing or decreasing a preexisting score for a computer program, wherein the preexisting score is based on performance of the computer program (and adjustments) during one or more prior generations, and wherein the increase or decrease is based on performance of the computer program (and adjustments) during a current generation. In this manner, scores from previous generations may be "carried over" between generations, and assessments (e.g., and conditional removal of the program and/or conditional generation of offspring based on the program) may be made based on cumulative total score and/or based a score adjustment for a current generation only.

In some embodiments, applying a scoring function may comprise starting with a current total score (either as initially instantiated to a default score level by the system, or as carried over from a previous generation) and applying one or more score adjustments based on the current generation. A primary score adjustment for a computer program based on accuracy of result data may be applied, and a secondary score adjustment based on one or more additional considerations may also be applied. The primary score adjustment may be based on a comparison of (a) result data generated by executing the computer program against (b) reference data computed based on a known algorithm/equation and/or taken from a historical (e.g., real-world) data set. Meanwhile, the secondary score adjustment(s) may be configured to exert one or more additional "evolutionary" pressures on the colony to encourage efficient evolution and eventual convergence of the colony towards one or more optimized solutions.

Turning to FIG. 2B, optional sub-processes for apply a scoring function to each computer program in the set are depicted. As shown, the optional sub-processes of FIG. 2B may be performed as part the performance of block 206.

At block 230, in some embodiments, the system may compute result data using a respective computer program of the set. In the example of system 100, block 230 may be executed by GPUs 106 of engine 102 of system 100. Result data may be computed by executing the computer program code of a given solution in the colony, for example based on input data provided to the program code. In some embodiments, one instance of result data may be generated for use in determining a primary score adjustment for the computer program. In some embodiments, more than one instance of result data may be generated, and a plurality of instances of results data may be used in determining the primary score adjustment for the computer program. For example, 128 instances of result data may be computed based on 128 different sets of input data (e.g., thereby performing 128 "experiments"), such as 128 randomly selected (and/or randomly generated) sets of input data. The 128 instances of result data (or some subset thereof) may then be used, as explained below, in applying the scoring function to generate a score for the computer program used to generate the result data. In some embodiments, computation and/or comparison of different pairs of result data for a single solution may be performed in series (e.g., one after the other); in some embodiments, computation and/or comparison of different pairs of result data for a single solution may be performed in parallel.

At block 232, in some embodiments, the system may apply a fit function by comparing the result data against reference data to determine a primary score adjustment for the respective computer program, wherein the primary score adjustment characterizes an accuracy of the result data. In the example of system 100, block 230 may be executed by GPUs 106 of engine 102 of system 100. In some embodiments, determination of the primary score adjustment may be based on comparing computed result data—e.g., a single instance of result data, multiple instances of result data, and/or an average or other collective measure of multiple instances of result data against computed and/or indexed reference data. In some embodiments, a corresponding instance of reference data may be looked up or computed for each instance of result data that was calculated at block 230. Thus, for example, 128 instances of result data are computed using a computer program in the population, then 128 respective corresponding instances of reference data may be computed or looked up, such that the instances of reference data may be compared, pairwise, to the computed instances of result data.

In some embodiments, reference data may be looked up in a source of historical (e.g., real-world) data. In some embodiments, reference data may be computed using a known formula or algorithm, e.g., to determine how accurately the computer program code has replicated or approximated the known formula or algorithm.

As one example of the processes of blocks 230-232, in the case of using method 200 to attempt to model historical information in the form of real-estate prices as a function of one or more variables, result data may be computed by selecting, as input data, characteristics (e.g., number of bedrooms, house square footage, lot size, location) of homes from historical real-estate data. The characteristics may then be used as input to calculate, using a formula provided by a computer program of one of the genomes of the population, result data including an estimated price for a home based on the data. The computed estimated home price may then be compared to the actual corresponding home price, as looked up in the set of historical data. A primary score adjustment for the computer program fitness may then be generated based on the similarity (or lack thereof) between the estimated home price and the actual home price. (Optionally, the primary score adjustment may be based on a plurality of such comparisons, such as 128 comparisons using 128 different sets of randomly selected historical data.)

As one example of the processes of blocks 230-232, in the case of using method 200 to attempt to replicate or approximate a known formula/algorithm in the form of the quadratic equation, result data may be computed by selecting, as each instance of input data, three random variables (a, b, c). The randomly-selected variables may then be used as input to calculate, using a formula provided by a computer program of one of the genomes of the population, result data including an estimated price for a home based on the data. Additionally, the randomly-selected variables may be used as input into the known quadratic equation, to compute a reference result. The computed result x may then be compared to the reference result. A primary score adjustment for the computer program fitness may then be generated based on the similarity (or lack thereof) between the computed result x and the reference result. (Optionally, the primary score adjustment may be based on a plurality of such comparisons, such as 128 comparisons using 128 different sets of randomly selected inputs.)

Generating the primary score adjustment that characterizes an accuracy of one of the computer programs in the colony may be based on comparing any suitable number of instances of result data pairwise to respective corresponding instances of reference data.

In some embodiments, absolute values of result data may be compared to absolute values of corresponding reference data. A ratio of the absolute values to one another may be used to compute a primary score adjustment. In some embodiments, the higher the ratio between the absolute values, the higher the (positive) primary score adjustment (wherein the relationship between ratio and primary score adjustment may be linear, logarithmic, exponential, or defined by another function).

In some embodiments, determining the primary score adjustment may include increasing the primary score adjustment (e.g., by a predefined amount), and/or setting the primary score adjustment to a predefined maximum primary score adjustment amount, if a difference between result data and reference data is less than a predefined threshold, thereby providing an extra incentive for nearly or exactly "perfect" answers.

In some embodiments, determining the primary score adjustment may include applying a predefined sign penalty (which may be a moderate or minimal penalty) that penalizes sign errors where the primary difference between the result data and the reference data is attributable simply to multiplication by −1. Use of a sign penalty in this manner may cause the system to positively incentivize computer programs whose only error is a flipped sign, thereby increasing the likelihood that those computer programs generate offspring that may flip the sign and arrive at an optimized result.

In some embodiments, determining the primary score adjustment may include applying a predefined penalty when the computer program incorrectly indicates that there is no valid solution, and/or applying a predefined reward when the computer program correctly indicates that there is no valid solution for given inputs. Use of a penalty or reward with regards to determining whether there is a valid solution for given inputs may cause the system to positively incentivize the population of computer programs to converge toward a valid domain before optimizing the computer program within that domain, which may increase efficiency and accuracy of the system. This may occur in cases in which the penalty or reward for accurately determining whether there is a valid solution is sufficiently high with regards to other factors included in the calculation of the primary score adjustment (e.g., other factors in the fit function).

At block 234, in some embodiments, the system may determine one or more secondary score adjustments for the computer program. In the example of system 100, block 230 may be executed by GPUs 106 of engine 102 of system 100. As described below, secondary score adjustments may be configured to create additional "evolutionary" pressures on the population of computer programs beyond the fundamental pressure (exerted by the primary score adjustment) to converge favor computer programs whose result data are similar to corresponding reference data. Secondary score adjustments may exert pressures on the population that consider the "age" of a computer program; that consider the script length, processing resources, and/or processing time required to execute a computer program; that consider the "diversity" of the population of computer programs as a whole; that consider the overall size of the population of computer programs; and/or that consider an amount of memory, other storage resources, and/or processing resources available to the system. Secondary score adjustments may improve the efficiency with which the population converges toward one or more optimized solutions, and may help to ensure that the system is not computationally overloaded by a population whose size becomes too large.

In some embodiments, the system may apply an "age" adjustment that is configured to favor "younger" computer programs that have existed in the population for fewer generations, as compared to "older" computer programs who have existed in the population for more generations. An age adjustment may be applied by decreasing the score for a computer program by an amount that positively corresponds to (e.g., by a positive linear, exponential, logarithmic, or other relationship) a number of generations for which the computer program has been present in the population of computer programs. In this manner, a computer program whose total score falls above a death threshold and/or above a reproduction threshold (see below for additional discussion) may be permitted to remain in the population for a number of generations, but may eventually be "aged out" as an increasingly negative age adjustment will eventually cause its total score to fall below the death threshold. This may allow the computer program the opportunity to produce offspring computer programs for one or more generations, while also ensuring that it does not remain in the population indefinitely. By ensuring that older computer programs eventually "age out," more room in the population (which may have a limited total amount of space) is created for younger computer programs to be generated and to themselves generate offspring.

In some embodiments, the system may apply a computational intensity adjustment that is configured to favor computer programs that require fewer computational resources (e.g., less machine time) to execute the computer program. A computational intensity adjustment may be applied by decreasing the score for a computer program by an amount that positively corresponds to (e.g., by a positive linear, exponential, logarithmic, or other relationship) one or more of: a script length of a computer program, an amount of memory used by a computer program, a number of loops included in a computer program, and/or a number of cycles required to run a computer program. In this manner, computer programs that are computationally efficient may be favored, and processing resources of the system may be conserved while favoring "leaner" computer program.

In some embodiments, the system may apply a population size adjustment that is configured to negatively adjust the score for all computer programs in the population by an amount that positively corresponds to (e.g., by a positive linear, exponential, logarithmic, or other relationship) the total number of computer programs in the population. In this manner, a population size adjustment may impose a penalty for "crowding" in the population, thereby ensuring that the colony does not become so large that it is computationally infeasible for the system to execute and analyze all of the computer programs in the population.

In some embodiments, the system may apply a memory adjustment that is configured to adjust the score for all computer programs in the population by an amount that corresponds to total system CPU memory remaining available for executing the genetics algorithm technique, and/or to a percentage of system memory currently being used for executing the genetics algorithm technique. In order to ensure that the overall colony does not exceed memory limits of the CPU, a negative adjustment applied to all computer programs in the population—where the extent of the negative adjustment increases as the percentage of system memory used by the genetics algorithm technique increases (e.g., this may scale linearly, exponentially, logarithmically, or by other relationship)—may help to ensure that system resources are not overwhelmed by the population while still being used at or near their maximum potential.

In some embodiments, both a population size adjustment and a memory adjustment may be applied. In some embodiments, only one of a population size adjustment and a memory adjustment may be applied, for example based on a user selection and/or a system determination. In some embodiments, only the adjustment that is larger, based on predefined calculation criteria for each adjustment, is applied.

In some embodiments, the system may apply a similarity adjustment that is configured to favor or disfavor computer programs based on a level of similarity of the code of the computer program to one or more other computer programs in the population. For example, the system may use a similarity adjustment to incentivize (or disincentivize) a computer program that is similar (e.g., using one or more code similarity metrics) to a large percentage (e.g., as defined by a threshold percentage) of the population. In some embodiments, one or more hashing functions may be used to assess whether a threshold number of copies of identical computer programs (or identical portions of code within computer programs) exist within the population, and to then optionally apply a similarity adjustment accordingly.

In some embodiments, any one or more of the above secondary score adjustments may be summed together into a single secondary score adjustment for a computer program for a single generation of the technique.

At block 236, in some embodiments, the system may apply the primary score adjustment and the secondary score adjustment(s) to a total score for the computer program to generate an adjusted total current score for the computer program. In the example of system 100, block 230 may be executed by CPUs 104 of engine 102 of system 100. The system may start with a current total score (either as initially instantiated to a default score level by the system, or as carried over from a previous generation) and may add or subtract the primary score adjustment and/or the secondary score adjustment(s), thereby calculating an updated current total score for the computer program. As described below, the respective updated current total score for each computer program may be used to determine whether and how to make one or more adjustments to the population of computer programs to evolve the population over multiple generations.

Returning to FIG. 2A, at block 208, in some embodiments, if a respective score for a computer program (accounting for adjustments applied at the current generation) is less than or equal to a first threshold, the system may remove the computer program from the set. In the example of system 100, block 230 may be executed by CPUs 104 of engine 102 of system 100. The process applied at block 208 may be referred to as applying a "death threshold." By removing computer programs from the set if their total current score falls below a death threshold, computer programs deemed unfit may be removed from the population, thereby freeing space for newly generated offspring computer programs to be added to the population and to potentially yield better results than the unfit programs.

At block 210, in some embodiments, if a respective score for a computer program (accounting for adjustments applied at the current generation) is greater than or equal to a second threshold, the system may generate one or more offspring computer programs by modifying code of the computer program whose score is greater than the second threshold, and may add the one or more offspring computer programs to the set of computer programs. In the example of system 100, block 230 may be executed by CPUs 104 of engine 102 of system 100.

The process applied at block 210 may be referred to as applying a "reproduction threshold," whereby programs deemed to be fit are allowed to generate one or more offspring programs. Generating offspring computer programs based on a currently existing computer program by modifying code of the currently existing computer program may allow for randomly-selected modifications that further improve performance of an already fit computer program, thereby allowing "natural selection" in the population to occur. Offspring may be generated and may be initialized with a starting total score equal to a default amount, or determined in accordance with a score of the parent computer program from which the offspring was generated. Offspring computer programs may be added to the population of computer programs such that they may be executed and assessed (and potentially generate further offspring) in subsequent generations.

In some embodiments, a number of offspring computer programs created based on a current program may be determined in accordance with the total current score of the current program. For example, when a current computer program has a score above the reproduction threshold, an offspring computer program may be generated and the score of the current computer program may be reduced by a predetermined amount (e.g., by the default score amount for a newly instantiated and/or offspring computer program). In this way, the current computer program may be understood to "give" some of its current score to its offspring. After reducing the current score of the current computer program in accordance with generating the first offspring, the remaining score may be assessed. If the remaining score is still above the reproduction threshold, then the offspring creation and score reduction process may be repeated. This process may be repeated any suitable number of times until enough offspring are created to reduce the current score of the preexisting computer program to below (or equal to) the reproduction threshold.

As stated above, offspring may be created with at least one "mutation" as compared to the parent computer program on which the offspring is based. That is, the offspring may include at least one modification, wherein the modification may be a modification to code (e.g., a modification to one or more commands in the code) of the computer program that defined the parent. However, as described above, mutating code according to one or more randomization processes may introduce a high likelihood that non-viable code is generated for offspring computer programs. Accordingly, one or more "guardrails" or "safeguards" may be put in place in order to mitigate or eliminate the possibility that non-viable code is generated. Processes for mutating code while ensuring code viability are described in greater detail below with respect to blocks 250-264.

Turning to FIG. 2C, optional sub-processes for generating an offspring computer program are depicted. As shown, the optional sub-processes of FIG. 2C may be performed as part the performance of block 210. In the example of system 100, any one or more of blocks 250-264 may be executed by CPUs 104 of engine 102 of system 100.

Blocks 250-264 describe a process for executing a single modification to code. In some embodiments, mutation of code for creation of an offspring computer program, may comprise performing multiple modifications to the code that defined the parent. In some embodiments, a number of modifications may be selected using one or more randomization operations. In some embodiments, a number of modifications may be specified by a user or by other system settings. In some embodiments, a number of modifications may be determined in accordance with the current fitness score of the parent computer program, and/or in accordance with one or more characteristics of the computer program code of the parent. Thus, all or part of the process of blocks 250-254 may be applied one or more times in generating a single offspring computer program. (It should be noted that an offspring with zero mutations, identical to the parent computer program, may in some embodiments be generated. Allowing for creation of offspring with zero mutations may allow for new versions of highly successful computer programs to remain present in the population even as the original versions age out.)

At block 250, in some embodiments, the system may determine a location in code of a respective computer program for a modification. In some embodiments, the system may use one or more randomization operations to select a location (e.g., a line, a command, a character, a position, etc.) in the code of the parent operation for modification. Alternately or additionally to using one or more randomization operations, one or more system settings and/or one or more user inputs may be used to select a location for modification of the code. In some embodiments, the system may select one or more locations in the code and may determine that one or more modifications should be made at those locations. In some embodiments, the system may proceed step-wise through each location in the code and may determine, at each location, whether or not a modification should be made at that location.

At block 252, in some embodiments, the system may determine a modification operation to be applied at the selected location. After determining a location for modification, the system may select a modification operation, for example by selecting from a predetermined set of available modification operations. Available modification operations may include, for example: an "insertion" operation by which a command is inserted into the code at the selected location; a "deletion" operation by which a command is deleted from the code at the selected location; and a "replace" operation by which a command is replaced in the code at the selected location.

In some embodiments, the system may use one or more randomization operations to select a modification operation to be applied. Alternately or additionally to using one or more randomization operations, one or more system settings and/or one or more user inputs may be used to select a modification operation. In some embodiments, the system may select one or more modification operations and may determine that the one or more selected modification operations should be applied. In some embodiments, the system may proceed step-wise through a list of each available modification operation and may determine, at each item in the list, whether or not the modification operation should be applied.

In some embodiments, the system may select from all available modification operations. In some embodiments, the system may select from one or more user-specified available modification operations. In some embodiments, the system may apply one or more conditions to the modification operation(s) applied, for example by restricting modification operations such that a command with an adjunct command (e.g., a copy command or a paste command) cannot be inserted, deleted, or replaced without performing a corresponding insertion, deletion, or replacement to an associated pair command in the code.

In some embodiments, when performing a replacement modification operation, the system may apply one or more predefined conditions. For example, if a "define constant" command is selected for replacement, the system may apply a weighted probability in favor of replacing the "define constant" command with another "define constant" command, such that only the constant value is replaced, rather than replacing the entire operation with a different command. (For example, the system may enforce a 30% change to retain the command itself and only replace the defined value, which may be a higher probability than if all possible replacement commands were equally weighted.) As another example, if a "load variable" command is selected for replacement, the system may apply a weighted probability in favor of replacing the "load variable" command with another "load variable" command, such that only the loaded variable is replaced rather than replacing the entire operation with a different command. (For example, the system may enforce a 10% change to retain the command itself and only replace the loaded variable, which may be a higher probability than if all possible replacement commands were equally weighted.)

In one specific example of selecting locations and modification operations using randomization operations, the system may be configured to generate a random number and to use the random number to determine how many "cycles" to apply as part of the mutation of computer program code for creation of an offspring computer program. For example, a random number between 1 and 12 may be generated to determine what integer number of cycles, between and inclusive of 1 and 12, to perform. All options 1 to 12 may be weighted equally, or the options may be weighted variably or according to a predefined function. For example, the system may be most likely to select 1 cycle, and less likely to select each greater number of cycles, and least likely to select 12 cycles—according to a predefined probability curve. After a number of cycles is selected, the system may perform the selected number of cycles. For each cycle, the system may move sequentially, command-by-command, through the code of the parent computer program. At each command (e.g., each location), the system may make a determination as to whether to perform a modification at the given location. In some embodiments, the determination may be made in accordance with one or more randomization operations, for example by randomly determining whether to make a modification at each command in the computer program, such that the probability of making a modification at each location is equal to 1/n, where n is the number of commands in the code. Accordingly, there is a possibility for each cycle that no modifications are made, and there is a possibility for each cycle that each and every command is modified. In most cases, some but not all commands may be selected for modifications. After the system has moved through each command and completed a cycle, the cycle process may repeat to achieve the selected number of cycles (e.g., up to 12).

At block 254, in some embodiments, the system may generate an offspring computer program using the determined modification operation at the determined location. The generated offspring computer program may be stored (along with any suitable metadata regarding creation of the offspring program, score information for the offspring program, and/or heritage information regarding the offspring program), in any suitable computer storage medium. In some embodiments, the offspring computer program may be immediately saved to solution colony 110 of system 100; in some embodiments, the offspring computer program may be saved to a temporary storage location, before being saved to solution colony 110, in order to ensure that viability criteria are satisfied and/or can be compensated, as described below with reference to blocks 256-262.

At block 256, in some embodiments, the system may determine whether one or more code criteria are satisfied by the generated offspring computer program. The code criteria may be configured to ensure (or increase the likelihood) that the computer program code is viable. Code viability may include, for example, the conditions that code can be analyzed and/or compiled and that execution of the code will not cause any stack overflows, other stack errors, divisions by zero, infinite loops, or other errors.

In some embodiments, code viability may require that, at no point during execution of the computer program code does a stack size for the computer program drop below zero.

In some embodiments, code viability may require that, upon completion of execution of the computer program code, a final stack size is equal to a predefined number. The predefined number may be 1, or it may be an integer number greater than 1 in cases in which a multivariate result of executing the computer program is sought.

In some embodiments, code viability may require that, at all times during execution of the code, command-specific stack size requirements (e.g., minimum stack size requirements) are met for each command to be executed.

At block 258, in some embodiments, if it is determined at block 256 that the one or more code criteria are satisfied, then the system may approve the offspring computer program and may add the generated offspring computer program to the set of computer programs.

At block 260, in some embodiments, if it is determined at block 256 that the one or more code criteria are not satisfied, then the system may determine whether one or more compensation operations are able to be applied to the modified computer program.

In some embodiments, the system may be able to select from a predefined menu of available compensation operations configured to correct corresponding viability failures. For example, if the system determines that a stack size impermissibly drops below zero during execution of modified command code, then a compensation operation may be applied to insert an additional command configured to increase the stack size immediately before the operation that impermissibly reduces the stack size below zero. In another example, if the system determines that a final stack size is not equal to 1, as may be required for a given operation, then the system may make one or more additional insertions, deletions, or modifications configured to cause the final stack size to be increased or decreased as necessary. In another example, if the system determines that a command-specific minimum stack size requirement is not met for a command that has been newly inserted (or replaced into) the code, then the system may apply a compensation operation to insert, delete, or modify a command immediately before the command whose stack-size requirement is not met, wherein the compensation operation is selected to increase the stack size to meet the requirements of the previously unsatisfied command.

The system may be configured such that compensation operations are made immediately adjacent to (e.g., immediately before or immediately after) a location at which an insertion, deletion, or modification was made. In some embodiments, a modification made pursuant to an attempted compensation may be selected according to one or more predefined rules; in some embodiments, a modification made pursuant to an attempted compensation may be selected according to one or more randomization operations.

In some embodiments, the system may be configured to automatically identify certain non-optimal modification patterns, and to automatically apply one or more compensation operations to correct the non-optimal modification pattern. For example, the system may be configured to automatically identify and correct one or more of the following:

Multiplication by one;
A swap operation before an add operation or a multiply operation;
Adjacent swap operations;
A duplicate operation, followed by a multiply operation, followed by a square root operation; or
Adjacent copy and paste operations. In some embodiments, one or more of the above operations may be compensated by being automatically removed from the computer program code.

In some embodiments, the system may be configured such that only a maximum possible number of compensation operations may be applied to compensate for a modification. For example, a maximum of two compensation operations (e.g., two compensating modifications) or three compensation operations (e.g., three compensating modifications) may be applied. If more compensation operations than the maximum permissible number is required, then the system may determine that compensating for the modification is not possible.

If the system otherwise cannot determine a viable set of compensation operations to be applied, then the system may determine that compensating for the modification is not possible.

At block 262, in some embodiments, if it is determined at block 260 that the one or more compensation operations are able to be applied to the offspring computer program, then the system may apply the one or more compensation operations to the offspring computer program. The code of the offspring computer program may be modified in accordance with the selected one or more modification operations, and the compensated computer program code for the offspring computer program may be saved in any suitable computer storage medium, including in temporary storage and/or in solution colony 110. Following block 262, the compensated offspring computer program may be approved for inclusion in the colony of computer programs, and method 200 may proceed to block 258.

At block 264, in some embodiments, if it is determined at block 260 that the one or more compensation operations are not able to be applied to the offspring computer program, then the system may revert the previous modification operation (e.g., the modification operation selected at block 252 and applied at block 254). Reverting a modification operation may comprise removing an inserted command, inserting a removed command, or replacing a replacement command with the original command that was replaced. In some embodiments, in cases where more than one modification operation was applied to generate an offspring computer program, reverting one or more modification operations may nonetheless yield a modified offspring computer program that includes one or more retained modifications that differentiate the parent computer program. In some embodiments, reverting one or more modification operations may cause the offspring computer program to be identical to the parent computer program; in these cases, the identical offspring computer program may be retained and added to the set, it may be further modified until acceptable one or more modifications are identified, or it may be removed from the population.

Following block 264, method 200 may then proceed to block 258, where the offspring computer program, with the at least one modification reverted, may be added to the set of computer programs, for example by being stored in temporary computer storage and/or in solution colony 110.

Returning to FIG. 2A, at block 212, in some embodiments, if a respective primary score adjustment for a computer program is greater than or equal to a third threshold, the system may select the computer program for performance of a task. This determination may be understood as a convergence condition, in which the system identifies a computer program whose primary score adjustment meets the third threshold as a computer program that is optimized for performance of the task for which the genetic algorithm system sought to optimize. For example, the identified computer program may be identified as a potential exact match for a formula/algorithm sought to be derived, or may be identified as a potential accurate model for historical data sought to be modeled. In some embodiments, computer programs whose primary score adjustment exceeds the third threshold may be considered to have achieved a "perfect score" with regards to having achieved perfectly accurate (or sufficiently perfectly accurate within a predefined margin of error) result data as compared to reference data. Determination of whether a "perfect" primary score adjustment has been achieved may be based on a plurality of comparisons (e.g., 128 comparisons) for a single solution; achieving a "perfect" primary score adjustment may require that result data matches reference data across all comparisons (or across a minimum threshold number or percentage of comparisons).

Notably, while the threshold comparisons at blocks 208 and 210, for death and reproduction respectively, are made with respect to the total current score for a computer program in the population, the threshold comparison at block 212 may be made with respect to the primary score adjustment for the current generation only (and not with respect to the secondary score adjustment and/or the total score for the computer program). This is because, even if a computer program is subject to one or more "environmental" pressures that may reduce its score due to secondary score adjustments, and even if a total score for the computer program is low (e.g., due to accumulated negative score adjustments over multiple generations), the computer program may nonetheless achieve highly accurate results in the current generation, and could indeed reflect an accurate algorithm or model that is highly fit and well-suited for performance of the target task. Thus, the system may be configured to flag and/or output computer programs as potentially suitable for performance of a target task based on the primary score adjustment at a single generation being sufficiently high.

In some embodiments, in response to the computer program being selected for performance of the target task, the system may store the selected computer program, display output of the selected computer program code and/or metadata, generate one or more alerts for a user, and/or deploy the computer program by applying a set of real-world data to the selected computer program.

At block 214, in some embodiments, the system may determine whether an additional generation of the process for assessment and condition modifications (e.g., block 204) should be performed.

In some embodiments, an additional generation may be executed by the system if no computer programs in the population satisfy the convergence criteria at block 212.

In some embodiments, additional generations may be ceased if one or more computer programs in the population do satisfy the convergence criteria at block 212. Optionally, if one or more computer programs in the population do satisfy the convergence criteria at block 212, the system may determine whether to continue generations, either by making an automatic determination or by prompting a user for input. In some embodiments, the program(s) satisfying the criteria at block 212 may be assessed to determine whether one or more additional cessation criteria, such as criteria related to succinctness (e.g., script length, machine time) of the computer program, are met. In some embodiments, a user may be prompted to enter an input indicating whether the system should continue to execute additional generations. In some embodiments, continuing to execute additional generations after one or more computer programs have satisfied the criteria at block 212 may cause the system to execute additional generations further until a computer program is identified that both (a) satisfies the criteria at block 212 and (b) is more efficient/succinct (e.g., by having a shorter script length or shorter machine time) than previously identified computer programs that satisfied the criteria at block 212. Upon identifying such a solution having improved succinctness, generations may then cease, or a user may be prompted again as to whether to cease generations.

In some embodiments, the system may be allowed to execute generations indefinitely, for a predefined number of generations, and/or until one or more other convergence criteria or cessation criteria are met. In some embodiments, if a predefined number of generations are executed without any primary score adjustment exceeding a predefined or dynamically determined threshold (which may be lower than the third threshold), then generations may be ceased.

At block 216, in some embodiments, if it is determined at block 214 that an additional generation should not be performed, the system may cease generations of the process for assessment and condition modifications (e.g., block 204).

On the other hand, if it is determined at block 214 that an additional generation should be performed, the system may return to block 204 and may perform a subsequent generation of block 204 based on the updated population of computer programs, having optionally removed one or more unfit computer programs and/or added one or more offspring computer programs.

At block 218, in some embodiments, optionally, before performing a subsequent generation of the process for assessment and condition modifications (e.g., block 204), the system may generate one or more new computer programs, and add the one or more new computer programs to the set. The newly generated computer programs may be generated in a same or similar manner as those computer programs initially instantiated in the initial population at block 202 (e.g., rather than being created as offspring of any preexisting computer program). In some embodiments, a predetermined or dynamically determined number of additional programs (e.g., a percentage of the total population, or a percentage of the number of new offspring computer programs) may be added to the population. Adding new computer programs to the population in this matter may stimulate additional diversity in the population and may therefore improve the efficiency and/or accuracy with which the system converges towards one or more target computer programs. For example, this technique may help to prevent the system from converging toward a local maximum at the expense of a global maximum.

During execution of the method explained above, the system may provide one or more user interfaces to a user for monitoring the progress of the system and/or for providing one or more inputs to the system. In the example of system 100, a graphical user interface may be provided via user device 120. A user may use the user device to configure one or more parameters of the system and/or to view one or more metrics regarding system performance and/or the population of computer programs being maintained and evolved by the system. For example, a user may view a "leader board" of the current highest-scored solutions (according to primary score adjustment for a current generation and/or according to total current score). The system can display computer program code and/or metadata regarding one or more programs in the population, and/or regarding the population as a whole. For example, the system may display information regarding a total number of programs that have been generated during the entire lifetime of the colony, a total number of programs in the colony, a highest-scored current program in the colony, a highest-scored all-time program in the colony, and/or lineage information regarding one or more programs in the colony.

Figure 3:
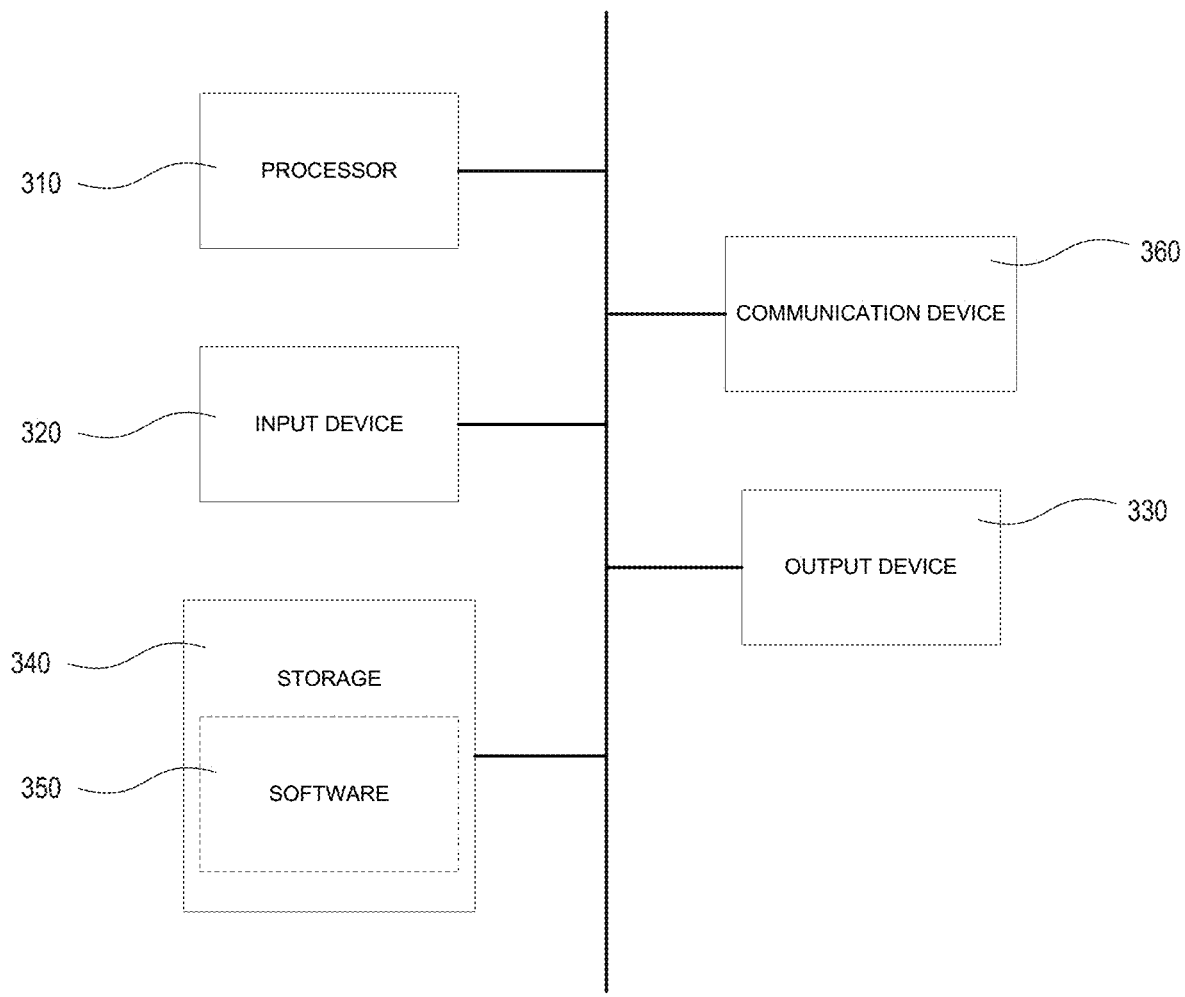
FIG. 3 depicts a computer, in accordance with some embodiments.

FIG. 3 illustrates a computer, in accordance with some embodiments. Computer 300 can be a component of a genetic algorithm system, such as system 100 and/or any of its subcomponents described above with reference to FIG. 1. In some embodiments, computer 300 may be configured to execute a method for automatically generating computer programs, such as all or part of method 200. In some embodiments, computer 300 may be configured to execute any of the other techniques discussed herein, alone and/or in combination with one another and/or with method 200.

Computer 300 can be a host computer connected to a network. Computer 300 can be a client computer or a server. As shown in FIG. 3, computer 300 can be any suitable type of microprocessor-based device, such as a personal computer; workstation; server; or handheld computing device, such as a phone or tablet. The computer can include, for example, one or more of processor 310, input device 320, output device 330, storage 340, and communication device 360.

Input device 320 can be any suitable device that provides input, such as a touch screen or monitor, keyboard, mouse, or voice-recognition device. Output device 330 can be any suitable device that provides output, such as a touch screen, monitor, printer, disk drive, or speaker.

Storage 340 can be any suitable device that provides storage, such as an electrical, magnetic, or optical memory, including a RAM, cache, hard drive, CD-ROM drive, tape drive, or removable storage disk. Communication device 360 can include any suitable device capable of transmitting and receiving signals over a network, such as a network interface chip or card. The components of the computer can be connected in any suitable manner, such as via a physical bus or wirelessly. Storage 340 can be a non-transitory computer-readable storage medium comprising one or more programs, which, when executed by one or more processors, such as processor 310, cause the one or more processors to execute methods described herein, such as all or part of method 200.

Software 350, which can be stored in storage 340 and executed by processor 310, can include, for example, the programming that embodies the functionality of the present disclosure (e.g., as embodied in the systems, computers, servers, and/or devices as described above). In some embodiments, software 350 can be implemented and executed on a combination of servers such as application servers and database servers.

Software 350 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 340, that can contain or store programming for use by or in connection with an instruction execution system, apparatus, or device.

Software 350 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines. Computer 300 may be composed of components which are interconnected across a network, such as a distributed system. Computer 300 may be organized into any suitable topology, such as a star topology, a recursively defined topology, a mesh topology, a ring topology, or an ad-hoc topology.

Computer 300 can implement any operating system suitable for operating on the network. Software 350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Example 1—Quadratic Equation Derivation

In one example, a genetic algorithm system was used to derive the formula for solving a quadratic equation:

$$ax^2+bx+c=0$$

This problem is not solvable with precision and explainability using known neural network and deep learning techniques. However, by applying a genetic algorithm system according to the disclosure herein, a colony of potential solutions was instantiated and evolved over a number of generations, with potential solutions being scored on the basis of (a) a fit function based on comparison to the known solution to the quadratic equation and (b) secondary score adjustments. Offspring solutions were generated at each new generation until a perfect solution for the equation was derived. The commands in the perfect solution derived by the system were expressed as follows:
 1: LOAD c
 2: LOAD b
 3: SQUARE
 4: CONST 4
 5: LOAD c
 6: LOAD a
 7: MUL
 8: MUL
 9: SUB
 10: SQRT
 11: LOAD b
 12: ADD
 13: DIV
 14: CONST −2
 15: MUL The derived perfect solution above is mathematically equivalent to the known formula for solving a quadratic equation:

$$x = \frac{-b \pm \sqrt{b^2 - 4ac}}{2a}$$

Example 2—Sine Function Approximation

In one example, a genetic algorithm system was used to derive an approximation for the sine function between $-\pi$ and $\pi$. By applying a genetic algorithm system according to the disclosure herein, a colony of potential solutions was instantiated and evolved over a number of generations, with potential solutions being scored on the basis of (a) a fit function based on comparison to values generated by the function sin(x) and (b) secondary score adjustments. Offspring solutions were generated at each new generation. The system was allowed to run overnight, and the following approximation was the highest-scored solution generated in this example:

$$\sin(x) \approx x\left(\left(\frac{\left(\frac{x^2}{16} - \frac{x^4}{256}\right)^{\frac{3}{2}}}{\frac{x^2}{16}}\right) - \left(\frac{x^2}{16} - \frac{x^4}{256}\right)\right)$$

The $R^2$ for this approximation between $-\pi$ and $\pi$ is greater than 0.9997.

Example 3—Depressed Cubic Equation Approximation

In one example, a genetic algorithm system was used to derive an approximation for the solution for the depressed cubic equation. A cubic equation $ax^3+bx^2+cx+d=0$ can be rewritten as a depressed cubic equation $t^3+pt+q=0$. The known solution to the depressed cubic equation is $$t = \sqrt[3]{-\frac{q}{2} + \sqrt{\frac{q^2}{2} + \frac{p^3}{27}}} + \sqrt[3]{-\frac{q}{2} - \sqrt{\frac{q^2}{2} + \frac{p^3}{27}}}.$$

By applying a genetic algorithm system according to the disclosure herein, a colony of potential solutions was instantiated and evolved over a number of generations, with potential solutions being scored on the basis of (a) a fit function based on comparison to values generated by the known solution to the depressed cubic equation and (b) secondary score adjustments. Offspring solutions were generated at each new generation. The system was allowed to run overnight, and the following approximation was the highest-scored solution generated in this example:

$$t = -\frac{2q}{p + \sqrt[3]{p^3 + 6q^2}}$$

The $R^2$ for this approximation for any positive p and q is greater than 0.997.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:
1. A system for automatically generating computer programs, the system comprising one or more processors configured to:
  generate a set of computer programs, wherein the set comprises a plurality of computer programs; and
  execute a process for assessment and conditional modification of the set of computer programs by, for each of the computer programs in the set of computer programs:
    applying a scoring function to the computer program to generate a respective primary score adjustment, a respective secondary score adjustment, and a respective current score based on the respective primary score adjustment and on the respective secondary adjustment;

if the respective current score is less than or equal to a first threshold, removing the computer program from the set of computer programs;

if the respective current score is greater than or equal to a second threshold, generating one or more offspring computer programs, for use in one or more subsequent generations of the process for assessments and conditional modifications of the set of computer programs, by modifying one or more commands in code of the computer program, and add the one or more offspring computer programs to the set of computer programs; and if the respective primary score adjustment is greater than or equal to a third threshold, selecting, compiling, and executing the computer program for performance of a task.

2. The system of claim 1, wherein the one or more processors are configured to, if none of the respective primary score adjustments are greater than or equal to the third threshold, execute a subsequent generation of the process for assessments and conditional modifications of the set of computer programs, wherein the subsequent generation is based on the set of computer programs following removal of any computer programs that did not satisfy the first threshold and following addition of any newly generated offspring computer programs.

3. The system of claim 2, wherein the one or more processors are configured to, at each subsequent generation, generate one or more new computer programs, and add the one or more new computer programs to the set of computer programs.

4. The system of claim 1, wherein respective current scores for each computer program of the set of computer programs are carried over from current generations to a subsequent generations and are modified by score adjustments at future generations.

5. The system of claim 1, wherein executing the process for assessments and conditional modifications of the set of computer programs comprises, for each computer program of the set of computer programs comprises, if the respective current score is greater than or equal to the second threshold, reducing the respective current score for a subsequent generation in accordance with a number of the one or more offspring computer programs that are generated by modifying commands in the code of the computer program.

6. The system of claim 1, wherein applying the scoring function comprises:
  computing result data using the computer program;
  comparing the result data against reference data to generate the primary score adjustment, wherein the primary score adjustment characterizes an accuracy of the result data; and
  determining the secondary score adjustment; and
  adjusting a respective previous score for the computer program, based on the primary score adjustment and the secondary score adjustment, to generate the respective current score.

7. The system of claim 6, wherein the reference data is retrieved from a database of historical data.

8. The system of claim 6, wherein the reference data is computed based on a reference algorithm.

9. The system of claim 6, wherein comparing the result data against the reference data comprises computing and comparing respective absolute values of the result data and the reference data.

10. The system of claim 6, wherein comparing the result data against the reference data to generate the primary score adjustment comprises applying a penalty if the result data incorrectly indicates that there is no valid solution.

11. The system of claim 6, wherein:
  computing result data comprises computing a plurality of instances of result data;
  the reference data comprises a plurality of instances of reference data; and
  comparing the result data against reference data comprises comparing the plurality of instances of result data pairwise against the plurality of instances of reference data.

12. The system of claim 6, wherein the secondary score adjustment is based at least in part on a number of generations for which the computer program has existed in the set.

13. The system of claim 6, wherein the secondary score adjustment is based at least in part on an amount of machine-time required to execute the computer program.

14. The system of claim 6, wherein the secondary score adjustment is based at least in part on a total number of computer programs currently in the set of computer programs.

15. The system of claim 6, wherein the secondary score adjustment is based at least in part on an amount of memory being used by the system.

16. The system of claim 6, wherein the secondary score adjustment is based at least in part on a similarity of the computer program to one or more other computer programs in the set.

17. The system of claim 1, wherein generating the one or more offspring computer programs by modifying one or more commands of the code of the computer program comprises making, in the code of the offspring computer program, one or more insertions, deletions, or replacements of a command as compared to the code of the computer program.

18. The system of claim 17, wherein making the one or more insertions, deletions, or replacements comprises randomly determining whether to make an insertion, a deletion, or a replacement.

19. The system of claim 17, wherein making the one or more insertions, deletions, or replacements comprises randomly determining a location in the code at which to make the one or more insertions, deletions, or replacements.

20. The system of claim 17, wherein generating the one or more offspring computer programs by modifying the code of the computer program comprises:
  determining whether the one or more insertions, deletions, or replacements for the code of the offspring computer program satisfy one or more code criteria;
  if the one or more code criteria are not satisfied, determine whether a compensation modification can be applied to correct the code of the offspring computer program;
  if the one or more compensation modifications can be applied, further modify the code of the offspring computer program using the compensation modification; and
  if the one or more compensation modifications cannot be applied, revert the one or more insertions, deletions, or replacements.

21. The system of claim 20, wherein determining whether the one or more code criteria are satisfied comprises determining whether the modified code would violate a stack size requirement.

22. The system of claim 20, wherein determining whether the one or more code criteria are satisfied comprises determining whether the modified code is free of one or more predefined inefficient command combinations.

23. The system of claim 1, wherein applying the scoring function comprises executing and assessing the computer program by performing a plurality of comparisons of generated result data for the computer program to reference data, by allocating different comparisons of the plurality of comparisons to different threads of a GPU of the one or more processors.

24. The system of claim 23, wherein the conditional removal of the computer program, the conditional generating of one or more offspring, and the conditional causing display of the indication that the third threshold has been satisfied are performed by a CPU of the one or more processors.

25. The system of claim 1, wherein executing the process for assessments and conditional modifications of the set of computer programs comprises, for each of the computer programs in the set of computer programs, if the respective primary score adjustment is greater than or equal to the third threshold, cease executing generations of the process.

26. The system of claim 1, wherein executing the process for assessments and conditional modifications of the set of computer programs comprises, for each of the computer programs in the set of computer programs, if the respective primary score adjustment is greater than or equal to the third threshold, continue executing generations of the process until a new computer program having a respective primary score adjustment greater than or equal to the third threshold and having a length that is shorter than that of the computer program is generated.

27. A method for automatically generating computer programs, the method performed by a system comprising one or more processors, the method comprising:
   generating a set of computer programs, wherein the set comprises a plurality of computer programs; and
   executing a process for assessment and conditional modification of the set of computer programs by, for each of the computer programs in the set of computer programs:
      applying a scoring function to the computer program to generate a respective primary score adjustment, a respective secondary score adjustment, and a respective current score based on the respective primary score adjustment and on the respective secondary adjustment;
      if the respective current score is less than or equal to a first threshold, removing the computer program from the set of computer programs;
      if the respective current score is greater than or equal to a second threshold, generating one or more offspring computer programs, for use in one or more subsequent generations of the process for assessments and conditional modifications of the set of computer programs, by modifying one or more commands in code of the computer program, and add the one or more offspring computer programs to the set of computer programs; and
      if the respective primary score adjustment is greater than or equal to a third threshold, selecting, compiling, and executing the computer program for performance of a task.

28. A non-transitory computer-readable storage medium storing instructions for automatically generating computer programs, wherein the instructions are configured to be executed by one or more processors of a system to cause the system to:
   generate a set of computer programs, wherein the set comprises a plurality of computer programs; and
   execute a process for assessment and conditional modification of the set of computer programs by, for each of the computer programs in the set of computer programs:
      applying a scoring function to the computer program to generate a respective primary score adjustment, a respective secondary score adjustment, and a respective current score based on the respective primary score adjustment and on the respective secondary adjustment;
      if the respective current score is less than or equal to a first threshold, removing the computer program from the set of computer programs;
      if the respective current score is greater than or equal to a second threshold, generating one or more offspring computer programs, for use in one or more subsequent generations of the process for assessments and conditional modifications of the set of computer programs, by modifying one or more commands in code of the computer program, and add the one or more offspring computer programs to the set of computer programs; and
      if the respective primary score adjustment is greater than or equal to a third threshold, selecting, compiling, and executing the computer program for performance of a task.

* * * * *